No. 656,396. Patented Aug. 21, 1900.
J. W. EISENHUTH.
MOTOR VEHICLE.
(Application filed Sept. 8, 1899.)
(No Model.) 3 Sheets—Sheet 1.
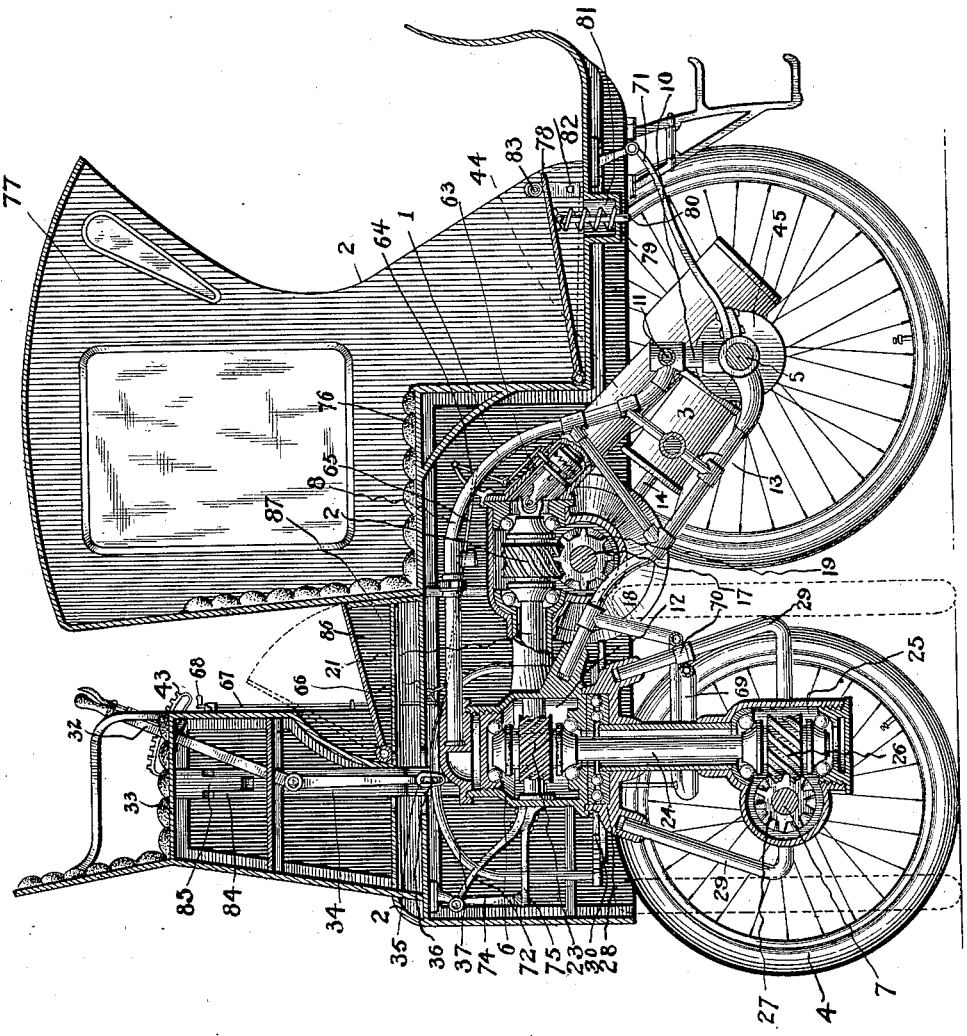
WITNESSES
INVENTOR No. 656,396. Patented Aug. 21, 1900.
J. W. EISENHUTH.
MOTOR VEHICLE.
(Application filed Sept. 8, 1899.)

(No Model.) 3 Sheets—Sheet 2.

WITNESSES

INVENTOR

No. 656,396. Patented Aug. 21, 1900.
J. W. EISENHUTH.
MOTOR VEHICLE.
(Application filed Sept. 8, 1899.)

(No Model.) 3 Sheets—Sheet 3.

WITNESSES

INVENTOR

UNITED STATES PATENT OFFICE.

JOHN WASHINGTON EISENHUTH, OF NEW YORK, N. Y., ASSIGNOR, BY MESNE ASSIGNMENTS, TO THE EISENHUTH HORSELESS VEHICLE COMPANY, OF SAME PLACE.

MOTOR-VEHICLE.

SPECIFICATION forming part of Letters Patent No. 656,396, dated August 21, 1900.

Application filed September 8, 1899. Serial No. 729,842. (No model.)

*To all whom it may concern:*

Be it known that I, JOHN WASHINGTON EISENHUTH, a citizen of the United States, residing at New York, in the county of New York and State of New York, have invented certain new and useful Improvements in Motor-Vehicles; and I do hereby declare the following to be a full, clear, and exact description of the invention, such as will enable others skilled in the art to which it appertains to make and use the same.

My invention relates to improvements in motor-vehicles, and particularly to that class of vehicles known as "cabs."

My invention consists in a vehicle provided with a suitable framing and carrying motors, the said vehicle having gearing driven by the said motors and connected with the rear wheels of the cab for imparting motion thereto, the said rear wheels being also constructed so as to guide the vehicle in its travel.

It also consists in a vehicle having a suitable framing, power-cylinders mounted thereon, gearing connecting the said power-cylinders with the guiding-wheels of the vehicle, and means for communicating the said power to the other wheels of the vehicle, also to assist in propelling the same.

My invention further consists in certain other novel constructions, combinations, and arrangements of parts, as will be hereinafter fully described and claimed.

Figure 3:
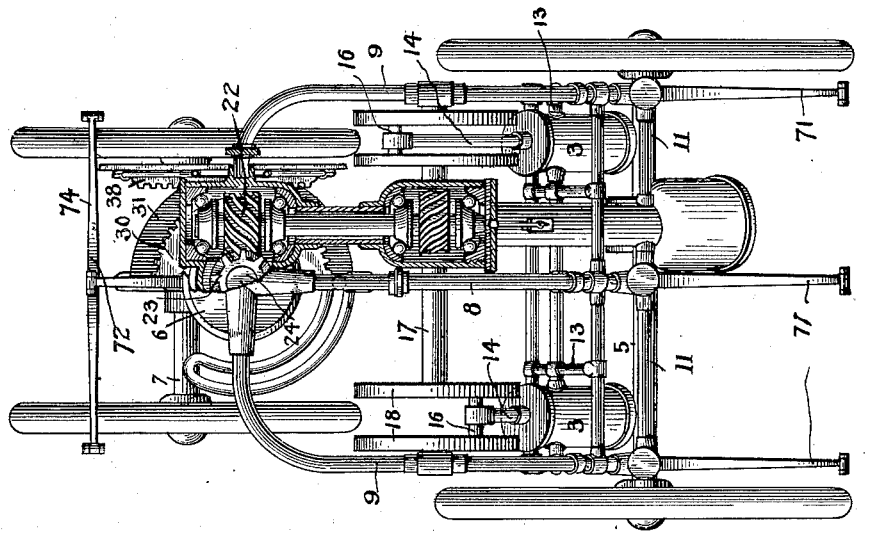
Figure 2:
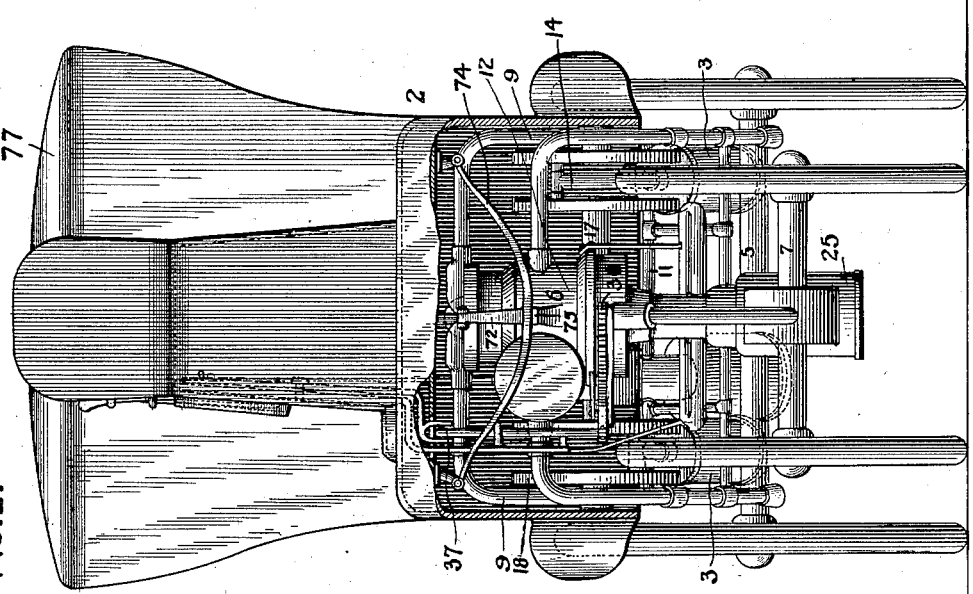
Figure 5:
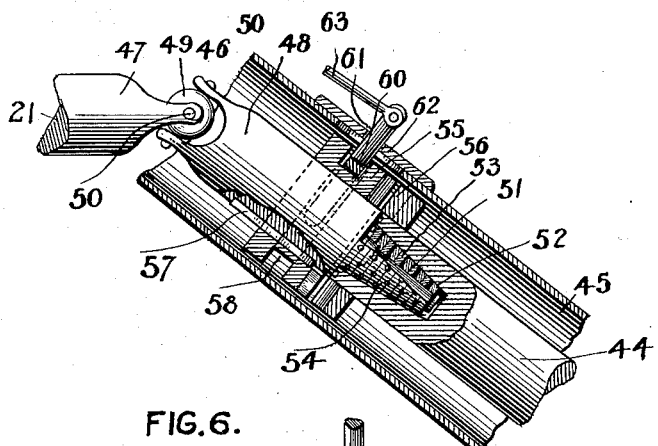
Figure 6:
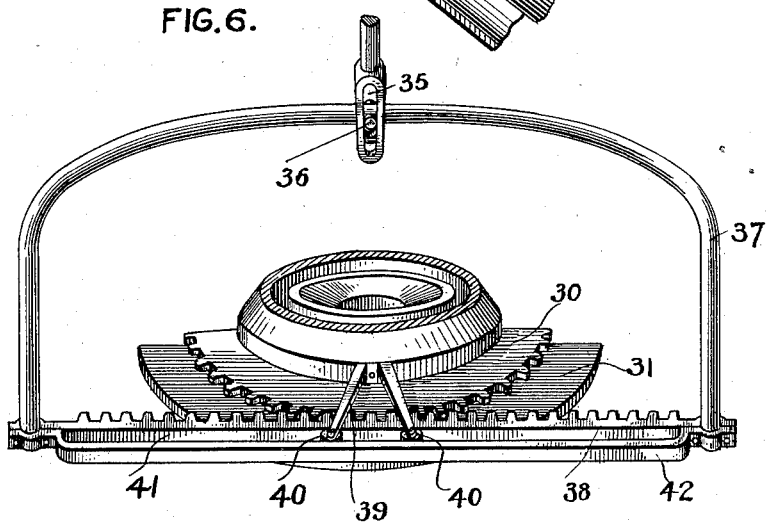
Figure 7:
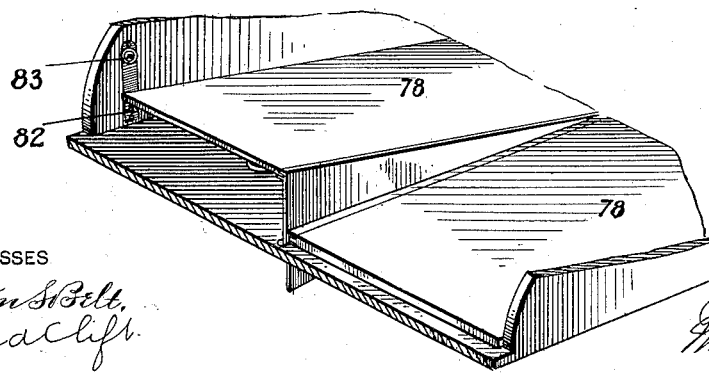

In the accompanying drawings, Figure 1 represents a vertical longitudinal section through a vehicle constructed in accordance with my invention. Fig. 2 represents a rear elevation of the said vehicle, parts of the body being broken away to reveal the construction of the running-gear. Fig. 3 represents a top plan view of the running-gear of my improved vehicle, parts being shown in section. Fig. 4 represents a detail perspective view of the driver's seat, showing the arrangement of the controlling-levers for operating the cab. Fig. 5 represents an enlarged detail sectional view of a universal joint as employed in the gearing on my improved motor-vehicle. Fig. 6 represents a detail perspective view illustrating the manner of turning the guiding-wheels; and Fig. 7 represents a fragmentary detail view of a portion of the cab-body, showing the foot-rest preferably used by me in my improved cab.

1 in the drawings represents the frame of my improved vehicle; 2, the removable body portion; 3, the power-cylinders, and 4 guiding-wheels.

My improved vehicle is designed to provide conveyances which may be used as cabs and which are preferably guided by means of the rear wheels. It is also designed to enable the operator to actuate the vehicle by means of the rear guiding-wheels, as well as to throw the forward wheels into action to assist in propelling the vehicle in difficult places or at other times where it may be found needful.

I do not wish to be understood as limiting my invention to cabs, as it may be readily applied to vehicles of all sorts without departing in the least from the spirit of my invention. I preferably, however, build the vehicle in the form of a cab, and therefore have illustrated it as such in the accompanying drawings.

In carrying out the features of my invention the frame 1 is preferably constructed of piping or tubing, which forms an arch extending from the forward axle 5 to the steering-head 6, arranged above the rear axle 7 of the vehicle. The tubing is preferably arranged in a central arched portion, as at 8, and two side arched portions, as at 9 9, the side arched portions being bent inwardly at the rear and joining the central arch above the steering-head. The forward ends of each arch are connected with vertical standards, as 10 10, the said standards being braced with respect to each other by suitable piping or tubing, as 11 11. The lower portion of each of the arches join the standards at the axle 5, as clearly seen in Fig. 1 of the drawings. The rear end of each of the arches finds a bearing in a suitable housing, as 12, the said housing being arranged above the steering-head and containing some of the driving-gearing. Each of the arches may be braced by suitable piping, and the power-cylinders 3 3 are pivotally mounted on some of the said braces, as at 13 13. These cylinders may be two or more in number, as is found necessary, for furnishing the requisite amount of power and are preferably oscillating cylinders of any desired type provided with pistons, the rods 14 14 of which engage cranks, as 16 16, formed upon the main power-shaft 17. Balanced disks or wheels, as 18 18, may be formed upon these cranks, as illustrated in Fig. 3 of the drawings, in order to give steadiness of motion.

To the power-shaft 17 is secured a spiral gear, as 19, which is adapted to mesh with a corresponding spiral gear 20, secured upon a horizontal longitudinally-arranged shaft 21. The shaft 21 extends into the housing 12, in which it finds a bearing, and carries in the said housing a spiral gear 22, which meshes with the corresponding spiral gear 23, secured to the upper end of a vertical shaft 24. The shaft 24 has bearings at its upper end in the casing 12 and extends downwardly to a point approximate to the shaft 7, the lower end of the said shaft finding bearings in a housing 25. To the lower end of the shaft 24 is secured a spiral gear 26, which meshes with and actuates a corresponding spiral gear 27, rigidly secured to the rear driving-shaft 7. This gear 27 is arranged centrally of the rear shaft 7, the shaft 24 being arranged immediately in front of it, as will be readily seen by reference to Figs. 1 and 3 of the drawings.

The housing inclosing the lower end of the shaft 24 is mounted in a guiding-head, formed of an upper plate 28 and downwardly-extending frame formed of piping, as at 29. The axis of the movement of the said guiding-head coincides with the axis of the shaft 24, so that the said guiding-head may be turned without altering the relation of the shaft 24 with the gearing upon the rear axle, and therefore without causing any binding between the parts. The framing 29 on the steering-head may be braced with respect to the framing 1 of the vehicle by means of a segmental loop 69, which is formed upon the said frame 1 and embraces the forward upwardly-extending pipe of the said framing 29, the said pipe being provided at this point with an antifriction-roller, as 70, which travels in the slot formed in the loop 69.

The steering-head 28 is provided upon its upper surface with bearing-surfaces adapted to receive ball-bearings, which are interposed between the said steering-head and the housing 12, which rests thereon. The steering-head can thus be turned with respect to the said housing without material friction. Secured to the said guide-head 28 is a segmental rack, as 30, which is preferably about semicircular in shape and extends toward one side of the vehicle, as seen in Fig. 3. Immediately beneath the segment 30 is a projecting plate or flange 31. In order to turn the guiding-head 28, and thus the guiding-wheels 4 4, for changing the direction of the vehicle, I provide a lever, as 32, which extends in suitable proximity to the driver's seat 33 on the rear of the cab. The said lever 32 is pivotally secured to an upright bar, as 34, rigidly secured to the framing of the vehicle. The lower end of the lever 32 is provided with a slot, as 35, which engages a pin 36, secured to a yoke 37. The yoke 37 carries at its lower end a rack, as 38, the teeth of which are arranged to mesh with the teeth of the segmental gear 30, as will be seen by reference to Fig. 6. The rack 38 is supported upon the flange or projecting plates 31 and is held in engagement with the teeth of the segment 30 by means of arms, as 39 39, which carry antifriction-rollers 40 40. The antifriction-rollers 40 travel in a slot, as 41, formed to one side of the rack 38, by means of a bar 42, rigidly secured to the said rack and to the said yoke 37.

It will be apparent that by moving the lever 32 the rack 38 may be caused to reciprocate and will impart a corresponding movement to the segmental rack 30, turning the guiding-wheels to the desired extent. The lever 32 is preferably provided with a toothed rack, as 43, also secured to the upright bar or standard 34, as clearly illustrated in Fig. 4. The lever engages the said tooth-rack 43 in the usual way by means of a spring-actuated dog controlled by a hand-lever.

From the above description it will be apparent that the vehicle is normally adapted to be propelled by means of the system of spiral gearing set forth, which is actuated by the power-cylinder, and that ordinarily the cab or vehicle is driven by means of the rear guiding-wheels. There are times, however, when it is desirable to be able to use the forward wheels of the vehicle to assist in propelling it, especially should the driving-wheels engage a slippery surface or in case a heavy load was being carried. I accomplish this purpose readily in my improved vehicle by mounting an inclined shaft, as 44, in a suitable housing, the said shaft extending from the forward end of the horizontal shaft 21 to a position approximate to the forward shaft 5. The said inclined shaft 44 is connected with the shaft 5 by means of spiral gearings similar to that heretofore described and shown and inclosed in a housing, as at 45, so that by actuating the said shaft 44 motion may be imparted to the forward shaft 45. In order to enable the shaft 21 to actuate the shaft 44, I use a universal joint, as at 46. The said universal joint comprises a bifurcated member 47, secured to the end of the shaft 21, and a bifurcated member 48, secured to the shaft 44. A sphere or ball 49, having projecting studs, as 50 50, is interposed between the bifurcated end portions of the said members 47 and 48, as clearly illustrated in Fig. 5. By this universal joint motion may be imparted to the shaft 44. The member 48 is not actuated rigidly with the shaft 44, but has a tapering bearing, as at 51, which engages a corresponding tapered socket, as 52, formed in the upper end of the shaft 44. A suitable packing 53 is interposed between the spiral bearing 51 and the socket 52. The said packing is preferably provided upon its outer surface with a series of depressions or sockets, as 54, adapted to hold oil or other lubricant for a considerable length of time. This is desirable at this point, inasmuch as the shaft 44 is not usually employed and the member 48 runs freely with the shaft 21. In order to join or disconnect the member 48 with the shaft 44 at will, I secure clutch members, as 55 and 56, to the said member 48 and the shaft 44, respectively. The clutch member 55 is splined upon the member 48 by means of a key or feather, as 57, so that the said clutch member will rotate with the member 48, but can be moved back and forth longitudinally thereon. The said clutch 55 is also provided with an annular recess, as at 58, which is adapted to be engaged by a fork 60, which fork has an arm projecting through a slot, as 61, in the housing 45. The said slot may be closed by means of a slide 62 to exclude dust and foreign substances from the bearings. The fork 60 is connected, by means of a link 63, with a lever 64, pivoted to the housing 45. A rod 65 connects the lever 64 with the bell-crank lever 66, pivoted to the body 2 of the vehicle. An operating-rod, as 67, extends upwardly to within easy reach of the driver's seat, where it is provided with a suitable operating handle or knob, as 68. It will be evident that by raising or lowering the rod 67 the clutch members 55 and 56 may be brought into engagement or separated, according as it is desired to use the front wheels in propelling the vehicles. The shafting is all preferably mounted upon ball-bearings, as seen in the drawings, so that they may be nicely adjusted and will operate upon antifriction-surfaces, all of which reduces the power necessary to actuate the vehicle.

The body portion of my improved cab or vehicle is preferably made so as to be easily removable from the framing 1 of the running-gear. In order to support the body portion 2 upon the framing 1, I secure supporting-springs, as 71 71, in the front and 72 in the rear. In the rear additional supporting-springs 74, mounted upon a projection 75 of the frame 1, may be used to further strengthen and brace the body 2 in its position. The body portion 2 is preferably formed of a boxing adapted to extend downwardly, so as to cover a large portion of the vehicle-driving mechanism. Upon the forward end of the said boxing is formed a seat, as at 76, to be occupied by the occupants of the vehicle, a cab or housing of any suitable design, as 77, being constructed over the said seat. The usual dashboard may be employed, as illustrated in the drawings. The only connection between the body portion 2 and the framing 1 will be seen to be the supporting-springs 71, 72, and 74, so that the body necessarily has a vertical movement with respect to the said framing under different loads. The body portion 2 can also be readily disconnected from the said springs and removed from the framing 1, so as to expose the gearing for inspection or repairs.

The driver's seat extends upwardly from the rear of the boxing 2 and may be steadied by means of a telescoping joint formed at 84 between a projecting piece or bar 85 on the said seat and the upper end of the bar or standard 34. The foot-rest for the driver may be formed of a pivoted platform, as 86, which may cover a recess or receptacle, as 87, in which tools or other implements may be carried.

It will be apparent from the above description that by my invention I am enabled to produce a cab or other vehicle which may be driven by the rear wheels and at the same time be actuated by the said rear wheels, and also one which may be further assisted in its propulsion by throwing the forward wheels into engagement with the power mechanism. It will also be seen that the parts are within easy control of the driver or operator.

Having described my invention, what I claim as new, and desire to secure by Letters Patent, is—

1. A motor-vehicle comprising a suitable framing, a housing secured to the said framing, a steering-head supporting said housing, a power-communicating shaft having one end projecting into the said housing and the other end extending through the said steering-head, the said shaft forming the pivoted pin or king-bolt of the vehicle, means for communicating power to the end of the said shaft which is located in the said housing, and means connecting the other end of the said shaft with the shaft of the guiding-wheels of the vehicle, the structure being such that the guiding-wheels of the vehicle may be driven by the power thus communicated to the said shaft without interfering with the guiding operation of the said wheels, substantially as described.

2. In a motor-vehicle, the combination of a suitable framing, one end of said framing resting upon one axle of the vehicle, a housing formed upon the other end of the said framing, a steering-head supporting the said housing, a shaft having bearings, both in the said housing and in the said steering-head for pivotally connecting the two together, a motor mounted upon the framing of the vehicle, gearing connecting the said motor with the end of the shaft which is in the housing and gearing connecting the other end of the said shaft with the axle of the steering-wheels, whereby the said shaft can communicate propelling power to the guiding-wheels without interfering with their steering operation, substantially as described.

3. In a motor-vehicle, the combination of a suitable frame formed of tubing suitably braced, the said tubing being supported at its forward end upon the forward axle of the vehicle, the rear tubing engaging a housing, arranged above the steering-head of the vehicle, a steering-head supporting the said housing, and mounted upon the axle of the guiding-wheels, gearing connecting a suitable power mechanism with the said guiding-axle, part of the shafting carrying the said gearing extending through the steering-head, so that its axis coincides with the axis of the steering-head, whereby the vehicle may be propelled, as well as guided by the steering-wheels, substantially as described.

4. A motor-vehicle comprising a suitable framing, composed of a central arch and side arches, the said arches being supported at their forward ends upon the forward axle of the vehicle, and the rear ends of the said arches converging to a common housing, a steering-head secured to the axle of the guiding-wheels, and supporting the said housing, shafting extending through the said housing and the said steering-head provided with suitable gearing, shafting leading from the said housing to a power mechanism mounted upon the frame, whereby power may be communicated to the axle of the guiding-wheels for propelling the vehicle, substantially as described.

5. A motor-vehicle comprising a frame carrying suitable power mechanism, a power-shaft actuated by the same, spiral gearing connecting the said power-shaft with the horizontal shaft, a vertical shaft mounted in the steering-head of the vehicle, spiral gearing connecting the horizontal shaft with the vertical shaft, and spiral gearing connecting the said vertical shaft with the rear axle of the vehicle, whereby motive power can be communicated from the power mechanism to the said rear wheels, a steering-head mounted upon the said rear axle and supporting the rear end of the frame, and means for turning the steering-head, whereby the vehicle may be guided by the rear wheels as well as propelled by the same, substantially as described.

6. A motor-vehicle comprising a suitable framing, a steering-head supporting the said framing, a segmental gear secured to said steering-head, a reciprocating rack engaging the said gear and a lever for moving the said reciprocating rack, whereby the steering-head may be turned to control the direction of the vehicle, substantially as described.

7. A motor-vehicle comprising in its construction suitable framing, gearing mounted on the said framing for propelling the vehicle, a steering-head supporting the said framing, a segmental gear secured to the said steering-head having a projecting flange beneath it, a reciprocating rack resting upon the said flange and engaging the said segmental gear, a yoke carrying the said rack, antifriction-rollers for directing the movement of the rack, and a lever connected with the said yoke by a pivot-and-slot connection, whereby the direction of the cab is controlled by moving the reciprocating rack, substantially as described.

8. A motor-vehicle comprising in its construction a framing, resting at its forward end upon a fixed axle, its rear end being mounted upon a turning axle, power mechanism mounted upon the same framing, shafting and gearing connecting the power mechanism with the turning or guiding axle, an inclined shaft connected with the said shafting and extending to the forward axle, a universal joint interposed between the shafting and the inclined shaft, and a clutch mechanism for drawing the said inclined shaft into and out of engagement with the said power-actuating shaft, the construction being such that the forward wheels may be used to assist in propelling the vehicle when desired, substantially as described.

9. A motor-vehicle comprising a suitable framing, a steering-head supporting one end of said framing, shafting connecting the rear or steering axle with power mechanism mounted upon the said framing, an inclined shaft connecting the power-actuating shafting with the forward axle, a universal joint interposed between the two, one member of the said universal joint being provided with a tapering bearing engaging a tapering socket formed in the inclined shaft, clutch members secured to the said parts, and a series of levers and links connected with the said clutch members and extending to within easy reach of the operator of the vehicle, whereby the forward axle of the vehicle may be used to assist in propelling the same as may be desired.

10. A motor-vehicle comprising in its construction a suitable framing, resting upon the forward axle at one end and upon a steering-head at the rear end, means for operating the steering-wheels to propel the vehicle, supporting-springs secured to the said framing, a removable body portion mounted upon the said springs and partially covering the said springs, propelling mechanism, seats, and an inclosing cab, formed upon the said boxing, and means for controlling the operating mechanism extending within easy reach of one of the seats, the structure being such that the vehicle may be operated from the seat, and, when desired, the body portion may be removed from the said frame to inspect the propelling mechanism, substantially as described.

11. A motor-vehicle comprising a suitable framing, a suitable power mechanism mounted upon the said framing, one end of the said framing resting upon one axle of the vehicle, a steering-head mounted upon the other side of the vehicle and supporting the housing upon the end of the framing, a shaft pivotally connecting the steering-head with the housing, gearing connecting one end of the shaft with the power mechanism, gearing connecting the other end of the said shaft with the guiding-wheels of the vehicle, and means connecting the said power mechanism with the fixed wheels of the vehicle, substantially as described.

In testimony whereof I hereunto affix my signature in presence of two witnesses.

JOHN WASHINGTON EISENHUTH.

Witnesses:
 VAN BUREN LAMB,
 S. INGERSOLL KELTON.